Jan. 6, 1953
G. A. EBERLE ET AL
2,624,242
PROFILING MACHINE
2 SHEETS—SHEET 1
Filed June 28, 1949
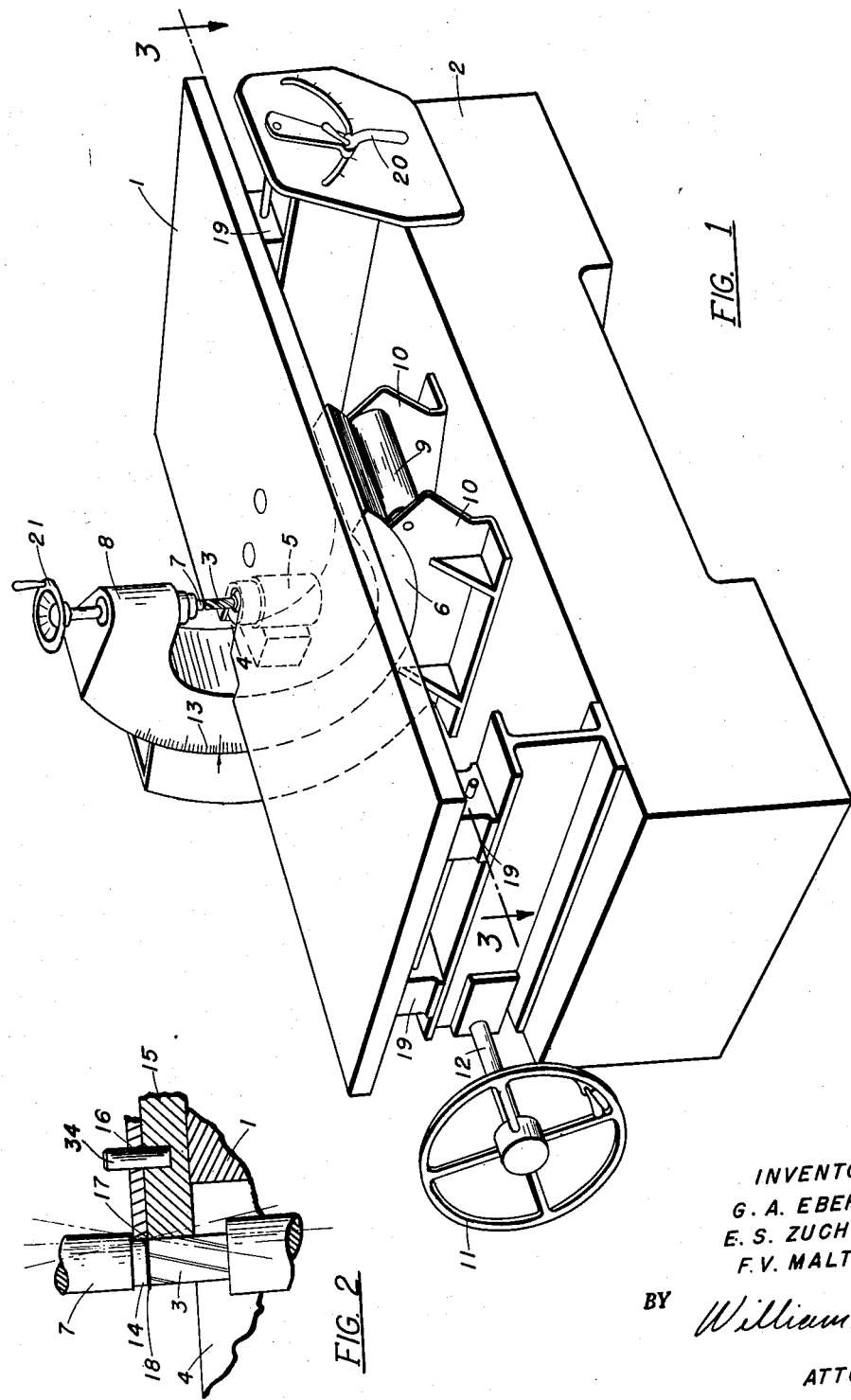
INVENTORS
G. A. EBERLE
E. S. ZUCHOWSKI
F. V. MALTBIE
BY William R. Lane
ATTORNEY

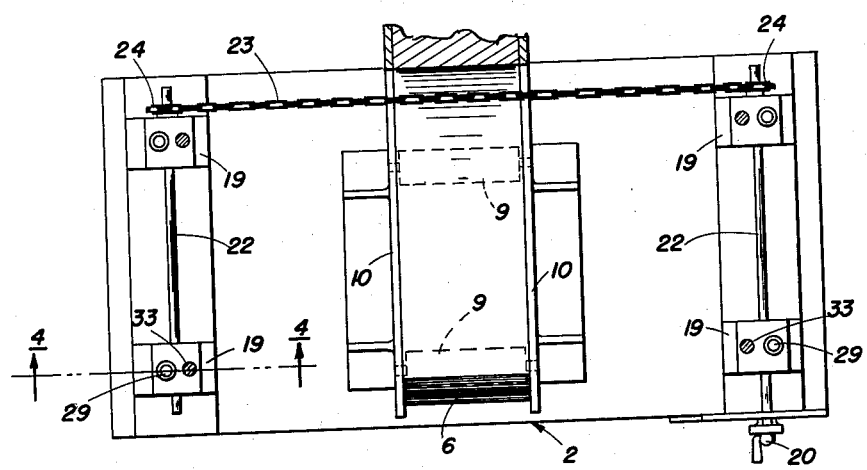
FIG. 3
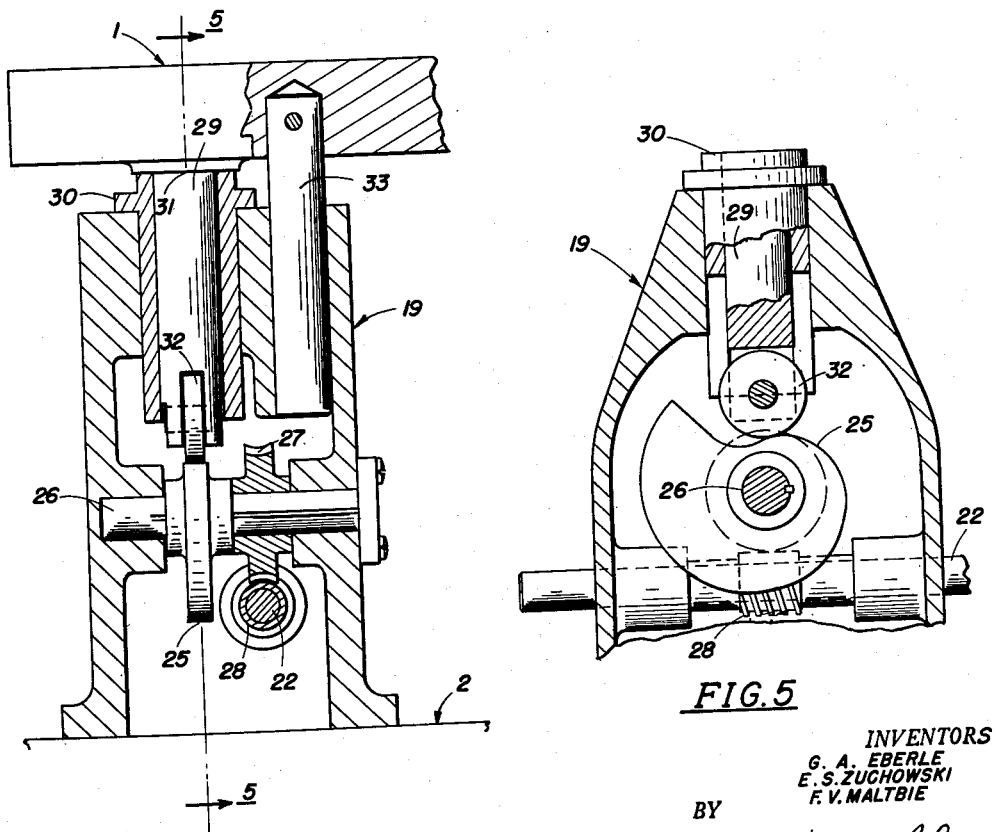
FIG. 4
FIG. 5
INVENTORS
G. A. EBERLE
E. S. ZUCHOWSKI
F. V. MALTBIE
BY
William R. Lane
ATTORNEY Patented Jan. 6, 1953

2,624,242

UNITED STATES PATENT OFFICE 2,624,242

PROFILING MACHINE

George A. Eberle and Edward S. Zuchowski, Inglewood, and Floyd V. Maltbie, Whittier, Calif., assignors to North American Aviation, Inc.

Application June 28, 1949, Serial No. 101,836

3 Claims. (Cl. 90—13)

The present invention relates to improvements in milling equipment and particularly to a machine for producing beveled and contoured edges.

In aircraft plants and in many structural sheet metal fabrication plants it is usual practice to produce many parts by hydropress forming operations or the like. Such parts are formed by pressing a sheet metal blank over a form block comprising a male or female die. The edges of such form blocks are beveled according to the angles required for the edge flanges. The angularity may vary from point to point or continuously about the perimeter of the part. The problem in the past has been to produce such form blocks economically and accurately.

It is accordingly an object of the present invention to provide means whereby form blocks may be rapidly and accurately produced.

It is a further object to provide means to cut form blocks of irregular contours having beveled edges.

It is also an object to provide means readily adaptable to the production of form blocks having edges beveled to continuously changing degrees, such beveling being relative to a heel line located by a template attached to the upper surface of the block.

Other objects of invention will become apparent from the following description, taken in connection with the accompanying drawing, in which:

Fig. 1 is a perspective view of a profile routing machine embodying the present invention;

Fig. 2 is an enlarged detail illustrating the relationship of the cutter and follower to the workpiece and template.

Fig. 3 is a plan view showing the table adjusting mechanism, taken as indicated at 3—3 in Fig. 1;

Fig. 4 is a sectional view of one of the adjusting units, taken at 4—4 of Fig. 3; and Fig. 5 is a sectional view taken at 5—5 of Fig. 4.

Referring to the drawing, the present machine comprises a table 1 supported upon a base 2. A cutter 3, such as a router bit, projects upwardly through a slot 4 in the table top. The router is driven by a motor 5 located beneath the table top and mounted upon an arcuate sector 6. A template follower 7 is also carried by the upper end 8 of the sector 6. The entire sector is supported upon a series of rollers as at 9, journaled in plates 10—10 mounted upon the bed 2. The sector 6 is arranged for angular adjustment by means of hand wheel 11 and extension shaft 12 through appropriate gearing such as a rack and pinion (not shown).

In operation the workpiece 15 is positioned upon the table 1 and is manually moved into contact with the cutter 3. A template or pattern 16 is secured to the upper surface of the workpiece by pins 34 for engagement by the follower 7. The forward edge of the follower is in alignment with the cutting face of the router bit. As the workpiece and the attached template are moved past the cutter 3, the workpiece is trimmed or routed to the outline of the template.

In producing form blocks and the like having beveled edges the cutter 3 may be positioned at any desired angle with respect to the table 1, which always remains horizontal, by rotating the sector 6 upon its supporting members. An indexing scale is provided at 13 for such adjustments, indicating the degree of tilt of the cutter.

The center of rotation of the sector 6 is located at point 17 where the upper surface of the workpiece 15 meets the face of the cutter 3. This point may be said to be the closest point on the periphery of the cutter to the template which lies in a plane established by the upper surface of the workpiece. By this arrangement a true relationship is assured at all times between the finished workpiece and the template since, regardless of the angles of bevel involved, the cut is taken from the heel line of the template. This is particularly advantageous where an edge being cut may require a continually changing degree of angularity. Such operations are readily performed by means of the machine illustrated by adjusting the degree of tilt of the cutter while the workpiece is being moved past the cutter.

A team of skilled operators can obtain many unique results since it is possible to vary the cutting angle continuously or at irregular rates, or reverse the angle of cut completely, going from an open to a closed angle, or vice versa, regardless of the outline of the template.

A small lip 18 may be provided about the lower edge of the follower 7 to assist in maintaining this member in proper contact with the template 16. This thin lip is arranged to ride under the template, preventing inadvertent disengagement or displacement which might result in the cutter coming into contact with the template or misalignment of the workpiece.

Workpieces of varying thickness may be accommodated by raising or lowering the entire table 1, and adjustment means is provided at 20 for obtaining vertical movement through jacks 19, located at each corner, the several units being interconnected through shafts 22, chain 23, and sprockets 24 for simultaneous movement as illustrated in Fig. 3.

Jacks 19 as shown in Figs. 4 and 5 may be cam type units, a cam 25 mounted on stubshaft 26 being actuated by means of worm wheel 27 driven by worm 28 on shaft 22. Cam 25 enages pin 29 mounted for vertical movement in sleeve 30 and bearing against a machined pad 31 on the under side of table 1. A roller 32 may be provided on pin 29 for contact with cam 25 to minimize friction. Guide pins 33 in each unit serve to stabilize table 1 with respect to jacks 19.

The table adjusting mechanism shown and described does not constitute invention per se except broadly in combination with the other elements of applicants' device since the particular adjusting mechanism is well known to persons skilled in the machining art.

Hand wheel 21 provides for vertical adjustment of the template follower 7 for initial setting, and to permit insertion of various template follower tips 14. Factors such as springback and varying degrees of bend allowance for different materials and gauges may thus be automatically provided for during the routing operation, resulting in finished parts that are accurate and true in every respect.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a machine for cutting the edges of work at predetermined angles, a table for supporting the work; a sector operatively associated with said table, the opposite ends of said sector extending respectively under and over said table; arcuate bearing means extending from beneath said table to one side thereof for supporting said sector for arcuate movement; cutter means carried by the portion of said sector below said table, said table having an opening through which said cutter means projects; a follower carried by the portion of said sector which overlies said table, the operative faces of said cutter and follower being in substantial alignment in all positions of said cutter, the center of movement of said sector being the intersection of said cutter with the upper surface of work supported by said table; and a template carried by said work and engaged by said follower to guide and position said cutter with respect to said work.

2. In a machine for cutting the edges of work at predeterminately variant angles, a table for supporting the work; a sector operatively associated with said table and having its opposite ends extending respectively under and over said table; bearing means supporting said sector for arcuate movement, said sector being provided with cutter and follower means at the opposite ends thereof, the operative faces of said cutter and follower means being in substantial alignment in all positions of said cutter, said follower being adapted to engage a template attached to said work, the center of movement of the sector being at a point on the periphery of the cutter closest to said template and in the plane of the upper surface of the work whereby the cutter will be guided with respect to said work in conformance with the positioning of said follower by said template.

3. In a machine for cutting the edges of work at predeterminately variant angles, a table for supporting the work; a sector operatively associated with said table and having its opposite ends extending respectively under and over said table; bearing means supporting said sector for arcuate movement, said sector being provided with cutter and follower means at the opposite ends thereof, the operative faces of said cutter and follower means being in substantial alignment, said follower being adapted to engage a template attached to said work whereby the cutter will be guided with respect to said work in conformance with the positioning of said follower by said template; and a flange on the lower end of said follower for engaging the under side of said template during the cutting operation.

GEORGE A. EBERLE.
EDWARD S. ZUCHOWSKI.
FLOYD V. MALTBIE.

REFERENCES CITED

The following references are of record in the file of this patent:

UNITED STATES PATENTS

| Number | Name | Date |
|---|---|---|
| 578,588 | Van Norman | Mar. 9, 1897 |
| 1,121,991 | Durkee | Dec. 22, 1914 |
| 1,237,487 | Dickie | Aug. 21, 1917 |
| 1,510,167 | Wilhelm | Sept. 30, 1924 |
| 2,004,070 | Gulliford | June 4, 1935 |
| 2,230,292 | Faso | Feb. 4, 1941 |
| 2,439,234 | Brantly | Apr. 6, 1948 |
| 2,507,982 | Krause | May 16, 1950 |